United States Patent
Fan et al.

(10) Patent No.: US 8,305,636 B2
(45) Date of Patent: Nov. 6, 2012

(54) UNDERCOLOR REMOVAL GRAY COLOR REPLACEMENT WITH IMPROVED DEVICE COLOR LINEARITY

(75) Inventors: Zhigang Fan, Webster, NY (US); Martin S. Maltz, Rochester, NY (US); Yao Rong Wang, Webster, NY (US); Alvaro Enrique Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 831 days.

(21) Appl. No.: 12/391,443

(22) Filed: Feb. 24, 2009

(65) Prior Publication Data

US 2010/0214616 A1 Aug. 26, 2010

(51) Int. Cl.
G06F 15/00 (2006.01)
(52) U.S. Cl. .......... 358/1.9; 358/518; 358/3.01; 382/162
(58) Field of Classification Search .......... 358/1.9, 358/518, 3.01; 382/162
See application file for complete search history.

(56) References Cited

U.S. PATENT DOCUMENTS

| 6,335,800 | B1* | 1/2002 | Balasubramanian | 358/1.9 |
| 7,411,696 | B2 | 8/2008 | Maltz | |
| 2005/0281459 | A1* | 12/2005 | Bala et al. | 382/162 |
| 2006/0209325 | A1 | 9/2006 | Nishikuni | |
| 2009/0161183 | A1* | 6/2009 | Schweid et al. | 358/518 |

OTHER PUBLICATIONS http://booksmartstudio.com/color_turorial/colortheory4.html, "A Practical Guide and Tutorial to Digital Color Management for Photographers," 4 pages, Feb. 8, 2008.
http://www.boodsmartstudio.com/color_tutorial/iccworkflow.html, A Practical Guide and Tutorial to Digital Color Management for Photographers, 6 pages, Feb. 8, 2008.

* cited by examiner

Primary Examiner — Twyler Haskins
Assistant Examiner — Michael Burleson
(74) Attorney, Agent, or Firm — Fay Sharpe LLP

(57) ABSTRACT

A system and methods for performing UCR/GCR (Undercolor Removal/Gray Color Replacement) in a digital printer is provided. The system and method includes maximizing the linearity of a color mapping function mapping a device independent color to a device dependent color through linear filtering and performing color projection to ensure color accuracy. The system and methods reduces graininess of printed color images having flesh-tones by also including a K reduction step.

20 Claims, 3 Drawing Sheets

UNDERCOLOR REMOVAL GRAY COLOR REPLACEMENT WITH IMPROVED DEVICE COLOR LINEARITY

BACKGROUND

The present application relates to the color imaging arts. It finds particular application to color conversion from a device independent color space to a device dependent color space.

Heretofore, computers and other electronic equipment have provided a target color to image forming machines, such as color printers, for reproduction in color images, such as color prints. The target color is typically defined in a device independent color space, an example of which can include L*A*B* color space. The printer includes an imaging path which converts the target color from the device independent L*A*B* color space to a device dependent color space, such as for example CMYK for a CMYK printer, so that the printer can reproduce the target color as an output color in the color image it produces.

The printer color conversion is usually composed of several one-dimensional (1-D) mappings, possibly one matrix multiplication, and one multi-dimensional mapping. The 1-D mappings are implemented as Tonal Reproduction Curve (TRC) look up tables (LUTs), while the multi-dimensional mapping is implemented as an multi-dimensional LUT plus interpolation operations. The multi-dimensional LUT is typically 3-dimensional in input and 4-dimensional (for CMYK) in output. It is organized to store a sampled version of the color mapping function on a 3-dimensional grid.

The color mapping function provides relationships between L*A*B* and CMYK color spaces. Specifically, it tells which CMYK combination may produce a particular L*A*B* color. When a color is to be mapped, the grid points that define the smallest cell containing the color are located. The LUT provides the converted color for the grid points, and the output color is linearly interpolated from these grid point colors.

For a CMYK printer, one L*A*B* color can typically be produced with more than one CMYK ink set. UCR/GCR (Undercolor Removal/Gray Color Replacement) is the procedure that selects one CMYK set from the multiple ink sets. The UCR/GCR decision is often optimized for printer gamut, ink consumption, text sharpness and other considerations.

The color mapping from L*A*B* can be conceptually divided into two parts, an L*A*B* to CMY mapping and a CMY to CMYK mapping. The former is determined by the printer engine characteristics, and the latter is performed by UCR/GCR. For printer engines that exhibit high curvatures, the color mapping can be strongly nonlinear, even with a relatively smooth UCR/GCR function. This may result in unacceptably high interpolation error for certain color areas. In some digital printers certain color areas can include a two dimensional manifold in CMYK space that maps to the same color in L*A*B* space. Similar colors in this area can be made with widely different CMYK formulations, and conventional methods tend to give L*A*B* to CMYK mappings with large jumps in the CMYK formulation between adjacent nodes in the multi-dimensional LUT.

Nonlinearity can be reduced by filtering the mapping function using linear low-pass filters. However, filtering also causes deviation in color. Consequently, the resulting mapping becomes less accurate. Specifically, suppose LAB (i, j, k) is the designed L*A*B* color for grid (i, j, k) and CMYK' (i, j, k) is the filtered CMYK value, CMYK' (i, j, k) may not necessarily produce the exact LAB (i, j, k).

Also, people are often very demanding in regards to flesh-tone image quality produced by digital printers. In CMYK printing, it is often desirable to use minimum amount of black (hereinafter referred to as K) toner or ink in a relatively light flesh-tone color, as K tends to introduce graininess. This is particularly important for print engines that may be susceptible to image noise. A big challenge for minimizing K in flesh-tone is to not significantly raise interpolation error or sacrifice printer gamut. To retain printer gamut, it is necessary to apply significant amount of K in the dark image regions, eventually using the maximum amount of K at the gamut boundary. Consequently, reducing K in flesh-tone makes K transition from minimum to maximum sharper. This is often accompanied by increased interpolation error.

The present application provides a new and improved method and apparatus for performing a UCR/GCR procedure which overcomes at least the above-described problems.

BRIEF DESCRIPTION

A method for performing UCR/GCR (Undercolor Removal/Gray Color Replacement) in a digital printer is provided. The method includes generating a grid of device independent color sampled nodes by sampling a color mapping function mapping a device independent color space at a plurality of sampling points (i,j,k) in the device-independent color space, generating a color list for each sampled node, each color list including one or more sets of device dependent color component combinations meeting a threshold accuracy criteria for the respective sampled device independent color node; selecting an initial device dependent color component combination from each color list; assigning each selected initial device dependent color combination to it's corresponding node; linear filtering the mapping function using the assigned device dependent color combinations; performing color projection by selecting a device dependent color value for each sampling point (i,j,k) to reduce minimize error in a device independent color space and to minimize curvature in the device independent to device dependent mapping function, and repeating the steps of linearly filtering and performing color projection for a predetermined number of times or until determining that interpolation error is less than a predetermined threshold.

The method for performing UCR/GCR can include a method of performing K reduction in a printed image further including forcing K to be less than a predetermined threshold and the repeating includes the steps of linearly filtering, performing K reduction, and performing color projection for a predetermined number of times or until determining that interpolation error is less than a predetermined threshold.

DETAILED DESCRIPTION

Figure 1A:
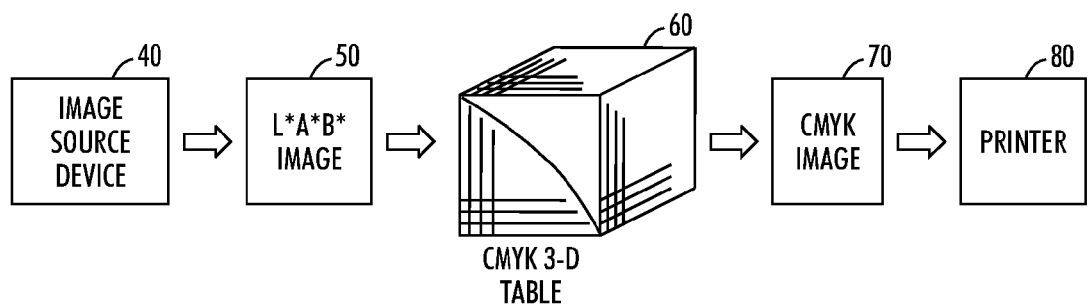
FIG. 1a is a block diagram showing color conversion processing of a device independent color to a device dependent color.

With reference now to FIG. 1a, an exemplary processing of a device independent color image 50 derived from an image source device 40 is shown. For the purposes of example, the device independent color image is depicted in L*A*B* color space. Other suitable device independent color space images may be applicable.

The L*A*B* image 50 is converted to a CMYK image 70 for printing by a print engine 80 in a digital printer. The flow diagram shown is in accordance with an international color consortium (ICC) workflow which calls for converting color image data formatted in a device independent color space such as, e.g., L*A*B, to a device dependent color space color image data formatted for a color printer such as for example, CMYK space. It is to be appreciated that the diagram shown in the FIGURE does not show all aspects of the ICC workflow and is intended only to show aspects of the ICC workflow that relate to the present application.

Figure 1B:
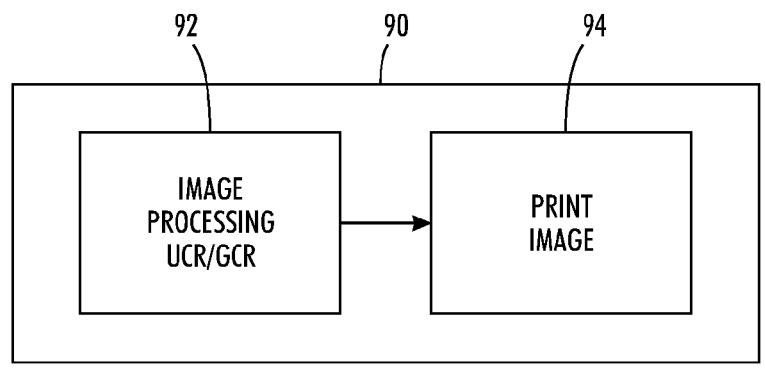
FIG. 1b is a block diagram of a digital printer having a UCR/GCR module.
Figure 2:
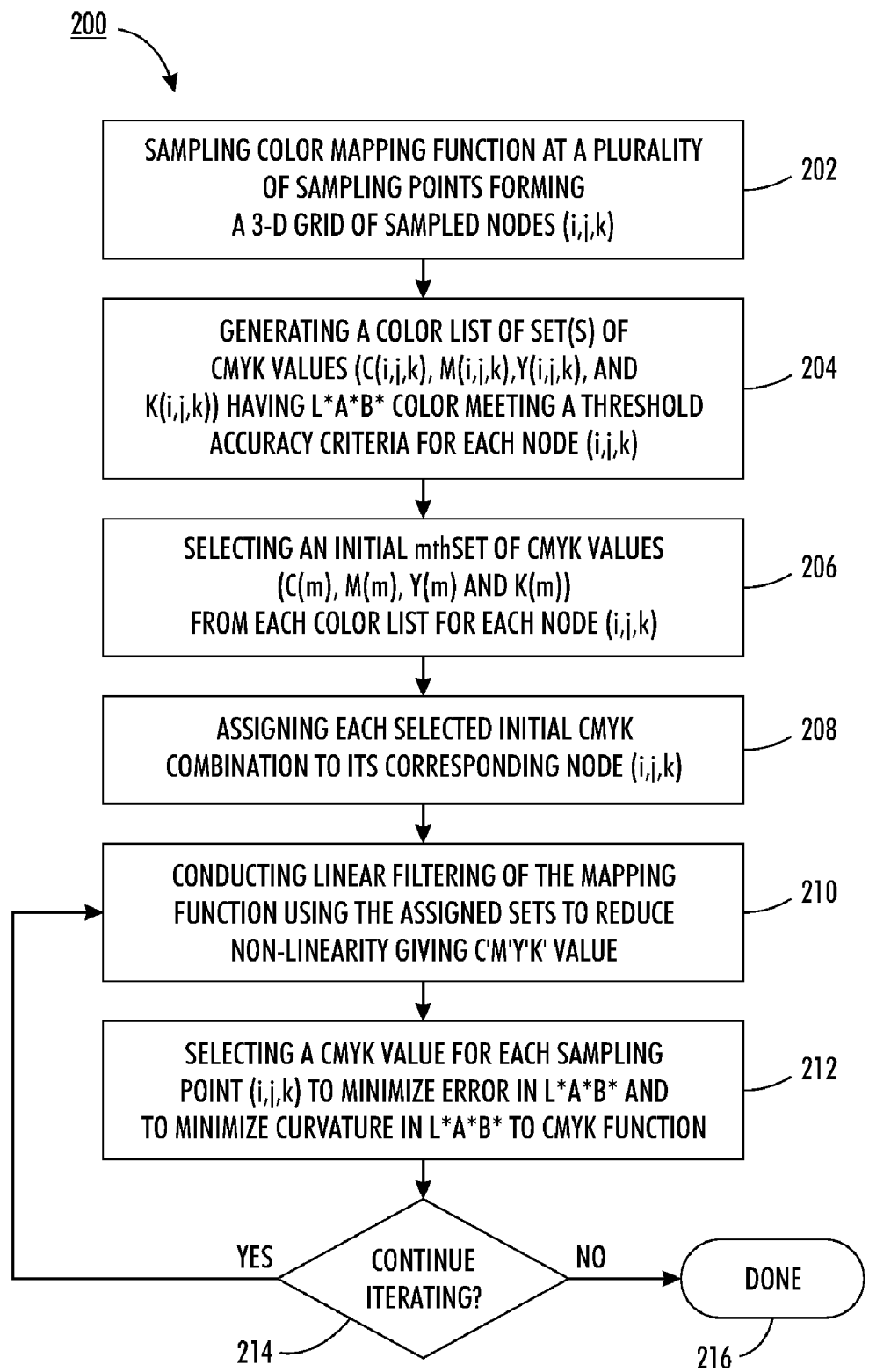
FIG. 2 is a flowchart of a method for UCR/GCR with maximized device color linearity.

Referring now to FIG. 2, a method for maximizing linearity and minimizing the mapping error in color mapping between device independent color and device color is shown generally at 200. The method can be performed by an image processing module or computing device 92 performing a UCR/GCR operation for producing device dependent colors for use by a print engine 94 in a digital printer 90 as shown in FIG. 1b.

The method 200 includes generating a grid of sampled nodes at 202 by sampling a color mapping function mapping a device independent color space at a plurality of sampling points (i,j,k) in the device-independent color space. In the exemplary embodiment provided herein, L*A*B* color space is used for the device independent color space, though it should be appreciated that other device independent color spaces can be used with similar results.

The sampling can be performed on a regular grid in L*A*B* space for convenience, though a grid which does not directly correspond to L*A*B* space can be used if so desired. It is desirable to have as high a sampling rate as computation cost will allow.

The method 200 further includes generating a color list at 204 for each sampled node. Each color list includes one or more sets of CMYK value combinations which meet a threshold accuracy criteria for the sampled L*A*B* node. One example of the accuracy criteria can include the L*A*B* color being equal to the mapped device dependent color. Another example of the accuracy criteria can include the L*A*B* color deviating from the mapped device dependent color by less than a predetermined threshold ($T_{ac}$), that is to say, deltaE<$T_{ac}$, wherein deltaE is an International Commission on Illumination (CIE) standard measure of color error (i.e. distance in color space). Other accuracy criteria can include (CIE) DeltaE2000<$T_{ac}$.

The color lists can be created empirically through experiments such as printing color patches and measuring the printed color patches. The color list can also be created by making a printer model and inverting it to find all the CMYK values that will produce a given L*A*B* value.

The method 200 further includes selecting an initial CMYK combination from each color list at 206. The initial CMYK combination can be referred to as the $m^{th}$ set of CMYK values (C(m), M(m), Y(m), and K(m)). The initial CMYK combination can be selected randomly. Alternatively, the initial CMYK combination can be chosen from the list using a pre-determined criteria. For example, the CMYK combination can be chosen having a color component, such as for example a K component, that is closest to the mean value for that component of all CMYK combinations in the list.

The method 200 further includes assigning each selected initial CMYK combination to its corresponding node at 208.

The method 200 further includes linearly filtered the mapping function at 210 using the assigned CMYK combinations. The support of the filter is preferably large enough to cover at least one Look Up Table (LUT) cell. Many smoothing filters can be applied, such as for example, an averaging filter as taught by U.S. Pat. No. 7,411,696 entitled "Smooth Gray Component Replacement Strategy that Utilizes the Full Device Gamut" to M. Maltz, which is hereby incorporated by reference herein in its entirety.

Next, a color projection operation is performed at 212 to minimize the distance in CMYK space from the one just found while simultaneously minimizing the distance in L*A*B* from the target color.

Specifically, for each sampling point (i, j, k), an $m^{th}$ CMYK combination is selected from the color list to meet the following criterion:

$$m = \arg_m \min$$
$$\{w_1\{[C(m) - C']^2 + [M(m) - M']^2 + [Y(m) - Y']^2 + [K(m) - K']^2\} ++$$
$$w_2\{[L(m) - L]^2 + [A(m) - A]^2 + [B(m) - B]^2\}\}$$

where $w_1$ and $w_2$ are the relative weighting between linearity and color accuracy. C(m), M(m), Y(m), K(m) and L(m), A(m) and B(m) are the CMYK and associated L*A*B* value of the m-th color in the list, C', M', Y', K' are the filtered CMYK value and L, A, B are the desired L*A*B* values for the node. All colors are referred to node (i, j, k), and the node indices have been dropped for clarity and simplicity.

The projection operation 212 improves the balance between linearity and color accuracy, enhancing color accuracy at the cost of mapping linearity. Therefore, one or more iterations of the linear filtering 210 and the color projection step 212 can be used to improve linearity of the mapping function.

After the projection operation 212, a decision is made at 214 whether to continue iterating, thereby repeating steps 210 and 212, or end at 216. It can be determined at 214 to continue iterating if a predetermined determined number of iterations have not yet been completed. It can be determined at 214 that iteration ends, as shown at 216, if a predetermined number of iterations have been completed.

The decision to continue iterating at 214 can also be made if no further improvement in linearity of the mapping function can be made by the repetition of steps 210 and 212, as measured by interpolation error in terms of DeltaE. If the interpolation error is less than a predetermined threshold $T_{IE}$ steps 210 and 212 will be repeated, otherwise the method ends at 216.

The proposed methods have been tested using Xerox iGen3 printer data in which 20 iterations were performed. When T (the threshold for maximum color deviation) was chosen to be 0 (i.e. no color deviation), a 2-5× improvement was achieved in terms of interpolation error.

The systems and methods described herein adjust the UCR/GCR to maximize the linearity of the multi-dimensional mapping function and minimize the mapping error. An iterative process is used in which, in each iteration, the mapping function is first linearly filtered to reduce non-linearity followed by a projection step to ensure the color accuracy.

In addition to reduced interpolation error, the proposed method 200 also has the advantage of being less sensitive to measurement error and machine drifting.

Figure 3:
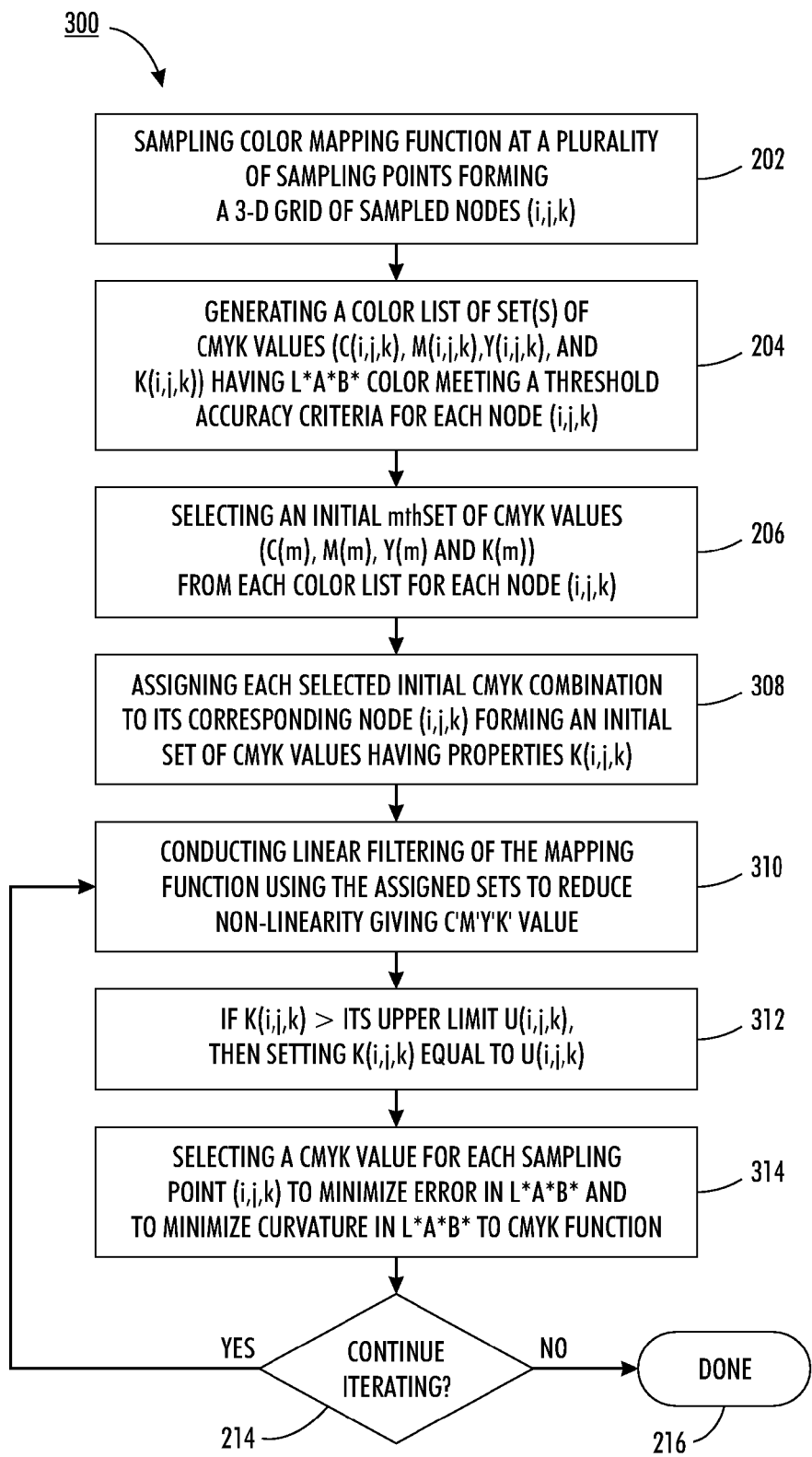
FIG. 3 is a flowchart of a method for flesh-tone K reduction in color conversion processing with maximized device color linearity.

Referring now to FIG. 3, a UCR/GCR procedure for flesh-tone K reduction is shown generally at 300. The method 300 can be performed by an image processing module computing device 92 for producing device dependent colors for use by a print engine 94 in a digital printer 90, as shown in FIG. 1b.

The flesh-tone K reduction procedure is similar to the mapping procedure 200 described above which takes the form as a constrained optimization problem. The optimization is reached through an iterative process that contains linear filtering, K reduction, and color projection in each iterative step. A desired K function can be applied as the initial K function to further shape the output and accelerate iteration convergence.

Specifically, the method 300 generates CMYK values for a color correction table with the following properties:

a) The color error, which is defined to be the differences between the L*A*B* color produced by the assigned CMYK, and L*A*B*(i, j, k), the desired L*A*B* color at the table nodes, is smaller than a predetermined amount D.

b) For each light flesh-tone node (i, j, k), the K value is smaller than a preset limit U(i,j,k). The limit may vary for each node.

c) The interpolation error in the mapping function is minimized.

The optimization is reached through an iterative procedure. An initialization procedure is first performed before the iteration, by performing steps 202 and 204 described above, to produce a list of CMYK combinations meeting a threshold accuracy requirement $T_{ac}$, as described above.

The method 300 further includes assigning each selected initial CMYK combination to its corresponding node at 308. The initial set of CMYK values having the properties of:

K(i, j, k) constitutes a smooth function, where K(i, j, k) is the K component of CMYK at node (i, j, k); and K(i, j, k) generally has a shape that is low in the light area (particularly for the light flesh-tone nodes) and is high near the gamut boundary.

These two properties provide a desirable K function. However, the initial condition may not ensure a small color error (<threshold D), or a satisfactory interpolation error. These are jointly optimized during an iteration procedure including linear filtering 310, K reduction 312, and color projection 314. In other exemplary embodiments, these step 310-314 can be performed in an arbitrary sequence.

Linear filtering of the mapping function is conducted at 310 using the assigned CMYK combinations from step 308. Linear filtering in the color space linearizes the CMYK functions and thus reduces interpolation error. The support of the filter is preferably large enough to cover at least one LUT cell. Examples of the linear filtering can include an averaging filter, wherein the filtering result of the processing node is obtained as the average of its 6 neighboring nodes (left, right, top, bottom, front, and back).

The non-linearity of the mapping function is reduced after filtering in 310. However, the constraints a) and b) discussed above may not be guaranteed.

The method 300 further includes performing a K reduction step at 312, wherein the K(i, j, k) is compared to its upper limit U(i,j,k), and K(i,j,k) is set to U(i,j,k), if it exceeds the upper limit. This step ensures compliance of constraint b) but may raise color error and non-linearity in mapping functions.

The method 300 further includes performing at 314 a color projection operation for each node (i, j, k) whose color error is not zero. Specifically, an m-th CMYK combination is selected from the color list to meet the following criterion:

$$m = \arg_m \min \{w_1 \{[C(m) - C']^2 + [M(m) - M']^2 + [Y(m) - Y']^2 + [K(m) - K']^2\} + + w_2\{[L(m) - L]^2 + [A(m) - A]^2 + [B(m) - B]^2\}\} \quad (1)$$

where $w_1$ and $w_2$ are the relative weighting between linearity and color accuracy. C(m), M(m), Y(m), K(m) and L(m), A(m) and B(m) are the CMYK and associated L*A*B* value of the m-th color in the list, C', M', Y', K' are the CMYK value obtained in the first two steps 310, 312 of the iteration, and L, A, B are the desired L*A*B* for the node. All colors are referred to node (i, j, k). For simplicity, the node indices were dropped.

The projection operation enhances color accuracy at the cost of interpolation error and K constraints. Although the color error in (1) is measured in DeltaE, other color accuracy measures, such as DeltaE2000 can also be applied.

After the projection operation 312, a decision is made whether to continue iterating at 214 similar to that described above. If iteration continues, steps 310, 214, and 314, are repeated, if not the method ends at 216.

As the iteration ends at 216, K values may be changed and K constraints cannot be strictly guaranteed. However, most applications may tolerate small deviations for K constraints. If K exceeds its preset limit by a large margin, it is often an indication that the K constraint target was set too aggressive and it cannot be reached.

The method 300 has been tested on a Xerox iGen3 digital printer for a $17^3$ LUT, performing 30 iterations. $T_{ac}$ (the threshold for maximum color deviation) was chosen to be 0 (i.e. no color deviation), and U(i, j, k) is set to 0 (no K) for LUT nodes associated with light flesh-tone. As $T_{ac}$ was selected to be 0, the second term in optimization of (1) was always 0. A 3× improvement was achieved in terms of interpolation error, and the K values for the light flesh-tone was been reduced by 15 digital counts on the average.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of performing UCR/GCR (Undercolor Removal/Gray Color Replacement) in a digital printer comprising:

generating a grid of device independent color sampled nodes by sampling a color mapping function mapping a device independent color space at a plurality of sampling points (i,j,k) in the device-independent color space;

generating a color list for each sampled node, each color list including one or more sets of device dependent color component combinations meeting a threshold accuracy criteria for the respective sampled device independent color node;

selecting an initial device dependent color component combination from each color list;

assigning each selected initial device dependent color combination to it's corresponding node;

linear filtering the mapping function using the assigned device dependent color combinations;

performing color projection by selecting a device dependent color value for each sampling point (i,j,k) to minimize error in a device independent color space and to minimize curvature in the device independent to device dependent mapping function; and repeating the steps of linearly filtering and performing color projection for a predetermined number of times or until determining that interpolation error is less than a predetermined threshold.

2. The method of claim 1 wherein the device independent color space is L*A*B* space and the device dependent color space is CMYK.

3. The method of claim 2 wherein the step of performing color projection further comprises for each sampling point (i, j, k), an $m^{th}$ CMYK combination is selected from the corresponding color list to meet the following criterion:

$$m = \arg_m \min$$
$$\{w_1\{[C(m) - C']^2 + [M(m) - M']^2 + [Y(m) - Y']^2 + [K(m) - K']^2\} ++$$
$$w_2\{[L(m) - L]^2 + [A(m) - A]^2 + [B(m) - B]^2\}\}$$

where $w_1$ and $w_2$ are the relative weighting between linearity and color accuracy, C(m), M(m), Y(m), K(m) and L(m), A(m) and B(m) are the CMYK and associated L*A*B* value of the m-th color in the list, C', M', Y', K' are the filtered CMYK value and L, A, B are the desired L*A*B* values for the node and all colors are referred to node (i, j, k).

4. The method of claim 1 wherein the sampling is done on a regular grid in the device independent color space.

5. The method of claim 1 wherein the accuracy criteria can include the device independent color being equal to the mapped device dependent color.

6. The method of claim 1 wherein the accuracy criteria includes the device independent color deviating from the mapped device dependent color by less than a predetermined threshold ($T_{ac}$).

7. The method of claim 1 further comprising performing K reduction forcing K to be less than a predetermined threshold and the repeating includes the steps of linearly filtering, performing K reduction, and performing color projection for a predetermined number of times or until determining that interpolation error is less than a predetermined threshold.

8. The method of claim 1 wherein the method is performed in a digital printer image processing module.

9. A method of flesh-tone K reduction in a digital printer comprising:

generating a grid of device independent color sampled nodes by sampling a color mapping function mapping a device independent color space at a plurality of sampling points (i,j,k) in the device-independent color space;

generating a color list for each sampled node, each color list including one or more sets of device dependent color component combinations meeting a threshold accuracy criteria for the respective sampled device independent color node;

selecting an initial device dependent color component combination from each color list;

assigning each selected initial device dependent color combination to it's corresponding node;

linear filtering the mapping function using the assigned device dependent color combinations;

performing K reduction forcing K to be less than a predetermined threshold;

performing color projection by selecting a device dependent color value for each sampling point (i,j,k) to minimize error in the device independent color and to minimize curvature in the device independent to device dependent mapping function; and repeating the steps of linearly filtering and performing color projection for a predetermined number of times or until determining that interpolation error is less than a predetermined threshold.

10. The method of claim 9 wherein the method is performed in a UCR/GCR (Undercolor Removal/Gray Color Replacement) procedure.

11. The method of claim 9 wherein the device independent color space is L*A*B* space and the device dependent color space is CMYK.

12. The method of claim 11 wherein the step of performing color projection further comprises for each sampling point (i, j, k), an $m^{th}$ CMYK combination is selected from the corresponding color list to meet the following criterion:

$$m = \arg_m \min$$
$$\{w_1\{[C(m) - C']^2 + [M(m) - M']^2 + [Y(m) - Y']^2 + [K(m) - K']^2\} ++$$
$$w_2\{[L(m) - L]^2 + [A(m) - A]^2 + [B(m) - B]^2\}\}$$

where $w_1$ and $w_2$ are the relative weighting between linearity and color accuracy, C(m), M(m), Y(m), K(m) and L(m), A(m) and B(m) are the CMYK and associated L*A*B* value of the m-th color in the list, C', M', Y', K' are the filtered CMYK value and L, A, B are the desired L*A*B* values for the node and all colors are referred to node (i, j, k).

13. The method of claim 12 wherein the initial set of CMYK values assigned in the assigning step have properties wherein K(i, j, k) constitutes a smooth function, where K(i, j, k) is the K component of CMYK at node (i, j, k), and K(i, j, k) generally has a shape that is low in a light area and is high near a gamut boundary.

14. The method of claim 9 wherein the accuracy criteria can include the device independent color being equal to the mapped device dependent color.

15. The method of claim 9 wherein the accuracy criteria includes the device independent color deviating from the mapped device dependent color by less than a predetermined threshold ($T_{ac}$).

16. A digital printer having an imaging processing module comprising:

the image processing module performing a UCR/GCR (Undercolor Removal/Gray Color Replacement) procedure including:

generating a grid of device independent color sampled nodes by sampling a color mapping function mapping a device independent color space at a plurality of sampling points (i,j,k) in the device-independent color space, generating a color list for each sampled node, each color list including one or more sets of device dependent color component combinations meeting a threshold accuracy criteria for the respective sampled device independent color node, selecting an initial device dependent color component combination from each color list, assigning each selected initial device dependent color combination to it's corresponding node, linear filtering the mapping function using the assigned device dependent color combinations, performing color projection by selecting a device dependent color value for each sampling point (i,j,k) to minimize error in a device independent color space and to minimize curvature in the device independent to device dependent mapping function, and repeating the steps of linearly filtering and performing color projection for a predetermined number of times or until determining that interpolation error is less than a predetermined threshold.

17. The digital printer of claim 16 wherein the device independent color space is L*A*B* space and the device dependent color space is CMYK.

18. The digital printer of claim 17 wherein the performing color projection further comprises for each sampling point (i, j, k), an $m^{th}$ CMYK combination is selected from the corresponding color list to meet the following criterion:

$$m = \arg_m \min$$
$$\{w_1\{[C(m) - C']^2 + [M(m) - M']^2 + [Y(m) - Y']^2 + [K(m) - K']^2\} ++$$
$$w_2\{[L(m) - L]^2 + [A(m) - A]^2 + [B(m) - B]^2\}\}$$

where $w_1$ and $w_2$ are the relative weighting between linearity and color accuracy, C(m), M(m), Y(m), K(m) and L(m), A(m) and B(m) are the CMYK and associated L*A*B* value of the m-th color in the list, C', M', Y', K' are the filtered CMYK value and L, A, B are the desired L*A*B* values for the node and all colors are referred to node (i, j, k).

19. The digital printer of claim 18 further comprising the image processing module performing K reduction forcing K to be less than a predetermined threshold and the repeating includes the steps of linearly filtering, performing K reduction, and performing color projection for a predetermined number of times or until determining that interpolation error is less than a predetermined threshold.

20. The digital printer of claim 19 wherein the initial set of CMYK values assigned have properties wherein K(i, j, k) constitutes a smooth function, where K(i, j, k) is the K component of CMYK at node (i, j, k), and K(i, j, k) generally has a shape that is low in a light area and is high near a gamut boundary.

* * * * *